July 25, 1967  L. G. URQUHART  3,332,449
PICK BALL STUD ASSEMBLY
Filed June 28, 1965
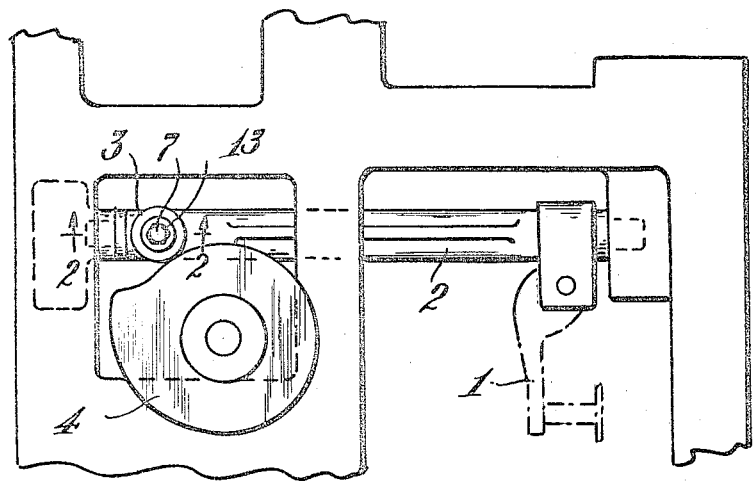
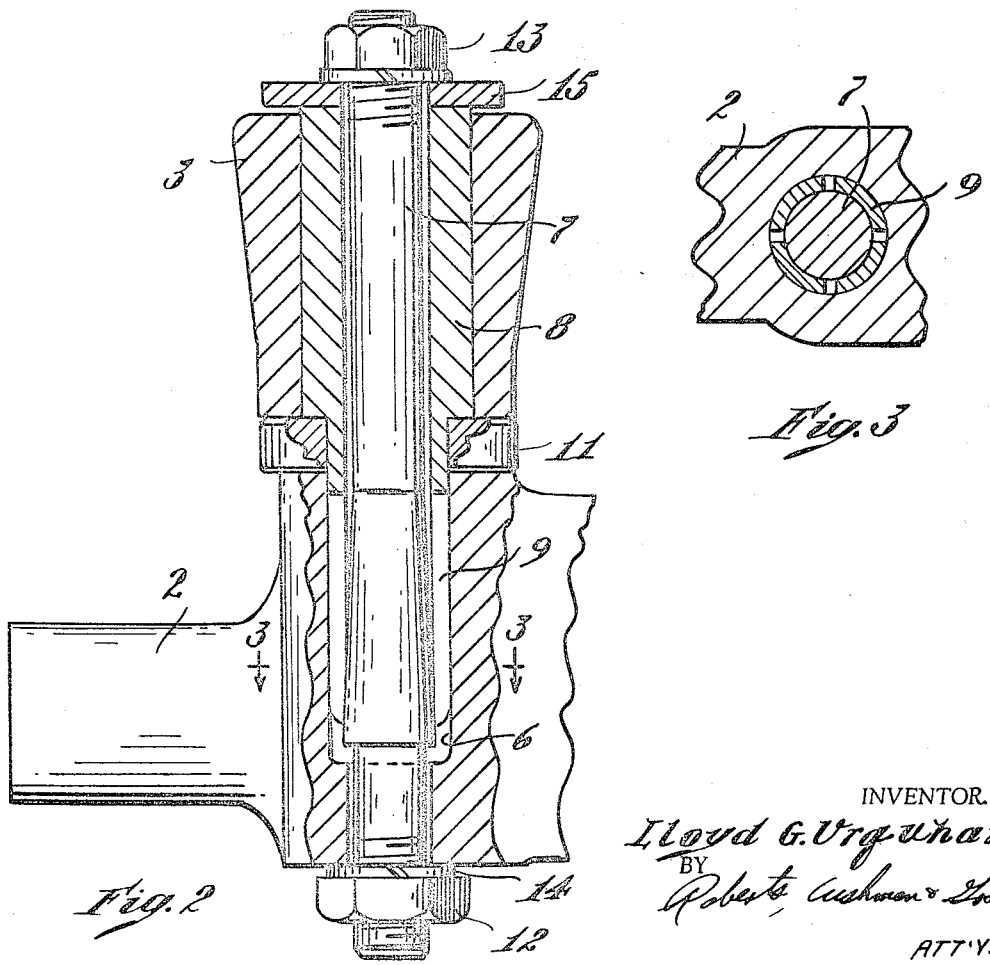
INVENTOR.
Lloyd G. Urquhart
BY
Roberts, Cushman & Grover
ATT'YS

United States Patent Office 3,332,449
Patented July 25, 1967

3,332,449
PICK BALL STUD ASSEMBLY
Lloyd G. Urquhart, Westboro, Mass., assignor to H. F. Livermore Corporation, Boston, Mass., a corporation of Delaware
Filed June 28, 1965, Ser. No. 467,343
3 Claims. (Cl. 139—142)

As commonly constructed a loom comprises a pick cam, a pick ball stud, a pick shaft and connecting means to the picker stick which kicks the shuttle back and forth. Heretofore the pick ball stud has been press-fitted into the pick shaft. To replace a pick ball it is necessary to remove the pick shaft and pick ball stud, after first removing the pick shaft boxes and the connecting parts to the picker stick, then take the shaft to a machine shop to press the new stud into the pick shaft, and then replace the parts in the loom. And in high-speed looms the alignment of the shaft and reassembling of the connecting parts must be gauged for satisfactory performance. This procedure results in high maintenance cost and loss of production.

Objects of the present invention are to eliminate the aforesaid maintenance cost and loss of production, to provide means for quickly and easily replacing a pick ball without removing the pick shaft from the loom and to provide a construction which is simple and economical to produce.

According to this invention the apparatus comprises the combination of a pick shaft and a pick-ball stud assembly, the shaft having an opening therethrough and said assembly comprising the combination of a pick shaft and a pick-ball stud assembly, the shaft having an opening therethrough and said assembly comprising a rod extending through said opening, a sleeve surrounding said rod with its inner end in said opening and its outer end projecting from the opening, a pick ball on said outer end, said inner end being split into two or more fingers so as to be expansible and said rod having a tapered portion inside said inner end to expand the inner end, and a nut on one end of the rod to draw said tapered portion into said inner end, thereby to lock said inner end in said opening. Preferably a nut is threaded on the other end of said rod to start said tapered portion out of said inner end. While the rod may taper in either direction, preferably it tapers toward the outer end of the stud.

For the purpose of illustration a typical embodiment of the invention is shown in the accompanying drawings in which FIG. 1 is a side view of the part of a loom comprising the pick ball stud assembly;

FIG. 2 is a section on line 2—2 of FIG. 1; and

FIG. 3 is a section on line 3—3 of FIG. 2.

The particular embodiment of the invention chosen for the purpose of illustration comprises a pick arm 1, a pick shaft 2 for actuating the arm, a pick ball 3 and a pick cam 4 bearing on the pick ball. The pick shaft has a transverse bore 6 and extending therethrough is a rod 7 surrounded by a sleeve comprising a large part 8 and a small part 9 with a shoulder therebetween. Disposed between this shoulder and the shaft 2 is a thrust washer 11. Rotatably mounted on the larger part 8 of the sleeve is the pick ball 3. As shown in FIG. 3 the smaller end 9 of the aforesaid sleeve is split to form fingers and the corresponding portion of the rod 7 is tapered. Threaded on opposite ends of the rod 7 are nuts 12 and 13 with washers 14 and 15 bearing on the shaft and sleeve respectively.

In assembling the parts nut 13 is first tightened to cause the tapered portion of the rod to expand said fingers, thereby to lock the sleeve in the shaft, and the nut 12 is then tightened. To disassemble the parts the nut 13 is first removed and the nut 12 is then tightened to unlock the sleeve 9 after which the sleeve and pick ball may be removed. Thus a pick ball stud may be replaced readily with the use of a wrench only and without removing the pick shaft from the loom.

It should be understood that the present disclosure is for the purpose of illustration only and that this invention includes all modifications and equivalents which fall within the scope of the appended claims.

I claim:

1. In a loom, the combination of a pick shaft and a pick-ball stud assembly, the shaft having an opening therethrough, and said assembly comprising a rod extending through said opening, a sleeve surrounding said rod with its inner end in said opening and its outer end projecting from the opening, a pick ball on said outer end, said inner end being split to form fingers so as to be expansible and said rod having a tapered portion inside said inner end to expand said fingers, and a nut on the outer end of the rod to draw said tapered portion into said inner end, thereby to lock said inner end in said opening.

2. The combination of claim 1 having a nut on the inner end of said rod to start said tapered portion out of said inner end.

3. The combination of claim 1 wherein said opening extends through the pick shaft so that both ends of the rod are readily accessible.

References Cited

UNITED STATES PATENTS

| 549,462 | 11/1895 | Peterson | 139—147 |
| 2,518,945 | 8/1950 | Sepavich | 139—147 |

FOREIGN PATENTS

| 518,195 | 3/1953 | Belgium. |
| 2,490 | 1883 | Great Britain. |
| 5,569 | 1889 | Great Britain. |
| 205,959 | 11/1923 | Great Britain. |
| 206,611 | 11/1923 | Great Britain. |
| 688,374 | 2/1940 | Great Britain. |

MERVIN STEIN, *Primary Examiner.*

J. KEE, *Examiner.*